No. 614,073. Patented Nov. 15, 1898.
A. BALL.
VALVE MECHANISM.
(Application filed Feb. 17, 1896. Renewed Oct. 6, 1898.)
(No Model.) 2 Sheets—Sheet 1.
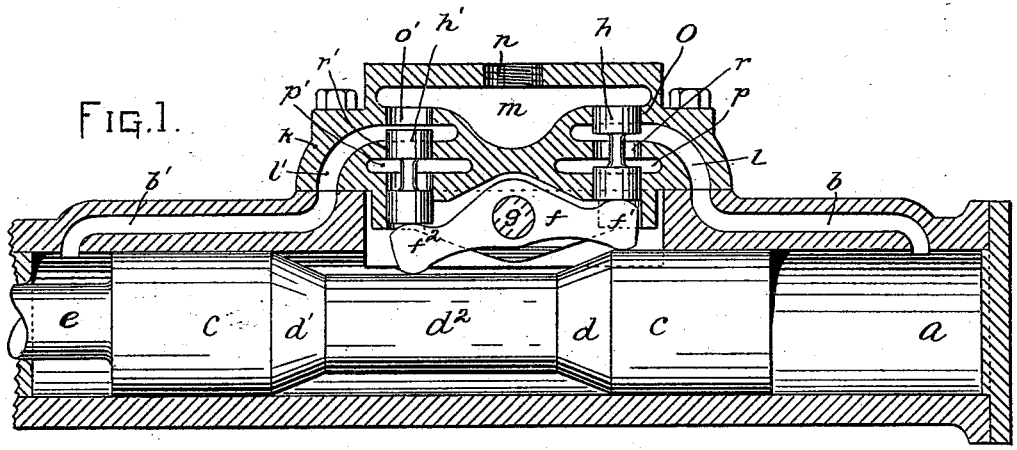
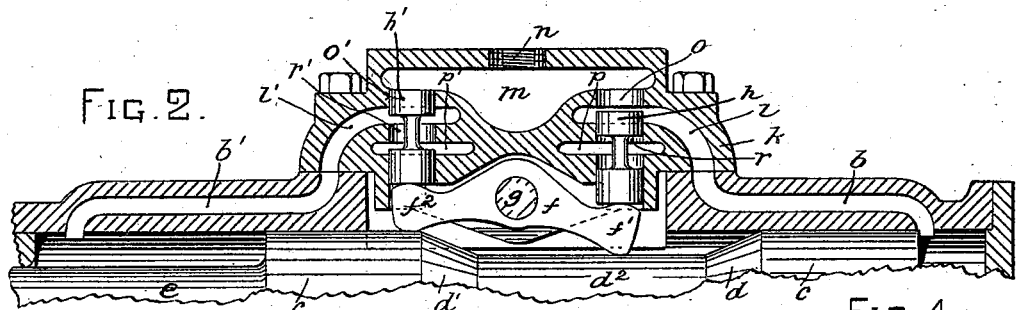
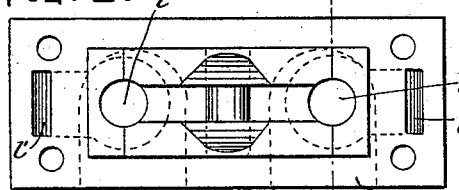 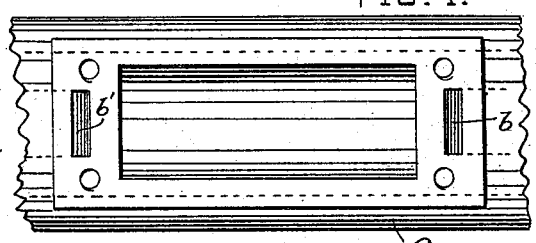
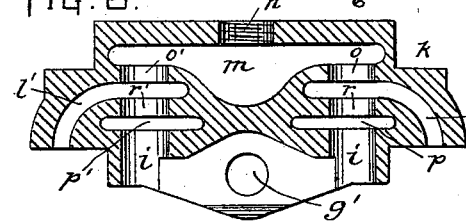 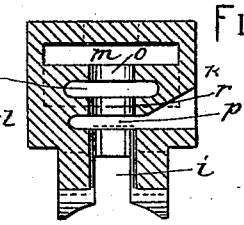
WITNESSES:
INVENTOR.
Albert Ball
By Kay & Totten
ATTORNEYS.

No. 614,073. Patented Nov. 15, 1898.
A. BALL.
VALVE MECHANISM.
(Application filed Feb. 17, 1896. Renewed Oct. 6, 1898.)
(No Model.) 2 Sheets—Sheet 2.

WITNESSES:
Robert C. Totten
Walter Famariss

INVENTOR.
Albert Ball
By Kay & Totten
ATTORNEYS.

UNITED STATES PATENT OFFICE.

ALBERT BALL, OF CLAREMONT, NEW HAMPSHIRE, ASSIGNOR TO THE SULLIVAN MACHINERY COMPANY, OF SAME PLACE AND CHICAGO, ILLINOIS.

VALVE MECHANISM.

SPECIFICATION forming part of Letters Patent No. 614,073, dated November 15, 1898.

Application filed February 17, 1896. Renewed October 6, 1898. Serial No. 692,861. (No model.)

*To all whom it may concern:*

Be it known that I, ALBERT BALL, a resident of Claremont, in the county of Sullivan and State of New Hampshire, have invented a new and useful Improvement in Valve Mechanism; and I do hereby declare the following to be a full, clear, and exact description thereof.

My invention relates to valve mechanism.

My invention comprises, generally stated, a piston having inclined faces thereon and a rocking or tilting lever whose ends are adapted to be engaged by said inclined faces, and valves engaging with said ends of rocking lever and adapted to open and close the ports leading to the cylinder.

Figure 7:
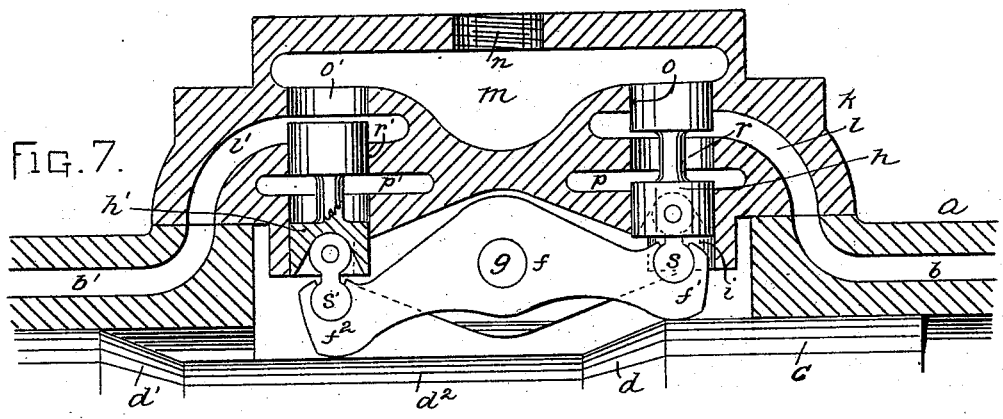
Figure 8:
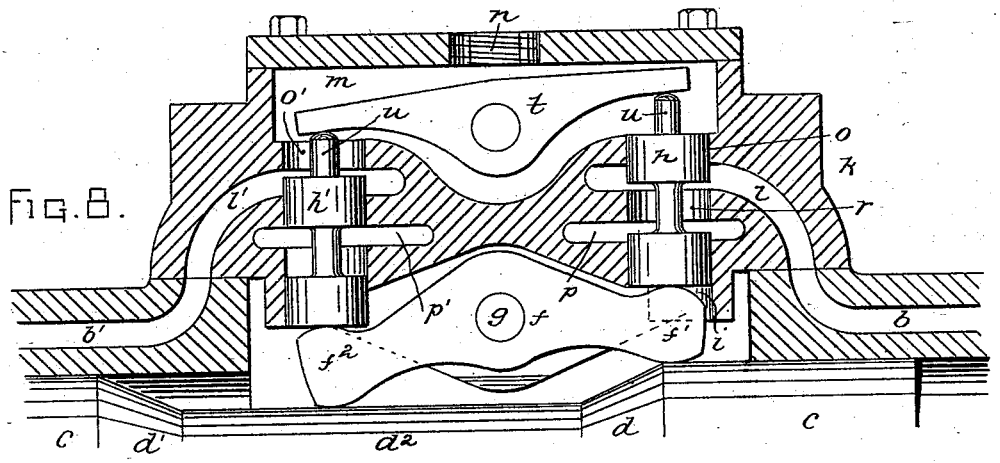

In the accompanying drawings, Figure 1 is a longitudinal section of my improved valve mechanism. Fig. 2 is a like view showing another position of the parts. Fig. 3 is a bottom view of the steam-chest. Fig. 4 is a top view of the cylinder. Fig. 5 is a longitudinal section of the steam-chest without valves or lever, showing the construction of the ports. Fig. 6 is a sectional view of steam-chest through the line 6 6, Fig. 3; and Figs. 7 and 8 are modified forms of my invention.

Like letters indicate like parts in each of the figures.

The letter $a$ represents a suitable cylinder having the ports $b$ $b'$ leading thereto. Within said cylinder $a$ is the piston $c$, said piston having the inclined faces $d$ $d'$ and the contracted portion $d^2$.

The letter $e$ designates the piston-rod.

Within the cylinder $a$ is the rocking or tilting lever $f$, said lever being mounted on the pin $g$, which passes through the openings $g'$ in the steam-chest and being adapted to rock or tilt freely thereon. The ends $f'$ $f^2$ of the rocking lever $f$ are adapted to engage the valves $h$ $h'$, respectively. The valves illustrated in this particular instance are in the shape of spools, and will be hereinafter referred to as "spool-valves," although I do not wish to limit myself in any way to any particular form of valve. These spool-valves $h$ $h'$ fit within suitable seats $i$ $i'$, formed within the steam-chest $k$. This steam-chest $k$ is bolted down upon the cylinder $a$, and said steam-chest has the ports $l$ $l'$ coinciding with the ports $b$ $b'$, respectively, of the said cylinder. The steam-chest $k$ has the chamber $m$, to which steam is admitted by the opening $n$. The steam-chest also forms, with the cylinder, the chamber $m'$, within which the lever $f$ works, said chamber $m'$ being also in communication with the cylinder $a$. This chamber $m'$ is cut off from the chamber $m$ so that no steam can pass into said chamber $m'$. This chamber $m'$ may be filled with oil, and the lever $f$ is always thoroughly lubricated, while at the same time the oil is wiped back and forth on the cylinder, which affords an excellent means of oiling the cylinder. The ports $o$ $o'$ open communication between the steam-chamber $m$ and the ports $l$ $l'$. The exhaust-ports $p$ $p'$ communicate with the ports $l$ $l'$ by means of the ports $r$ $r'$.

In Fig. 7 I have illustrated another form of my invention, in which the ends of the rocking lever $f$ are attached, by means of links $s$ $s'$, to the valves $h$ $h'$. By connecting the ends of the rocking lever $f$ to the valves the valves are always sure to be lowered and there is no liability of their sticking in their seats or failing to operate.

In Fig. 8 I have illustrated another form of my invention, in which an additional rocking lever $t$ is employed in the steam-chamber $m$, the ends of said rocking lever $t$ engaging with studs $u$ on the upper ends of the valves $h$ $h'$, whereby the ends of said rocking lever act to force down the valves in case they should stick for any reason.

The operation of my improved valve mechanism is as follows: The air, steam, or other motive force employed is admitted to the chamber $m$, and with the parts in the position shown in Fig. 1 the air will pass through the port $o'$ to the communicating ports $l'$ $b'$ and thence to the cylinder $a$. With the parts in the position shown in Fig. 1 the end $f'$ of the rocking lever $f$ will be engaged by the piston at its greatest diameter, while the end $f'$ is in contact with the contracted portion $d^2$, and consequently the valve $h$ will be raised to close the port $o$ and open the port $r$, leading to the exhaust. The exhaust-air is therefore passing by the communicating ports $b$ $l$ to the exhaust-port $p$. The air having been admitted by the port $b'$ to the cylinder, the piston is forced to the right of the drawing, whereupon the inclined face $d'$ of the piston will engage with the end $f^2$ of the rocking lever $f$ and will raise said end $f^2$ to the position shown in Fig. 2, the opposite end $f'$ having descended the inclined face $d$ to the contracted portion of the piston. By this movement of the piston the valve $h$ has been lowered, while the valve $h'$ has been raised. The valve $h$ is lowered by the pressure of the air, while the valve $h'$ is raised by the rocking lever operated on by the incline of the piston.

This is one of the distinctive features of this invention—namely, the lowering of the valves by the steam-pressure. In this manner the port $o'$ has been closed and the port $r'$, leading to the exhaust-port $p'$, has been opened, while, on the other hand, the port $o$ has been opened to admit air to the communicating ports $l$ and $b$ and the exhaust $p$ has been closed. The piston then moves back again to the position shown in Fig. 1.

I do not limit myself to the particular forms of mechanism shown; but this may be varied without departing from the spirit of my invention.

By the above construction I am enabled to dispense with the use of the little holes and small ports which are required by a reversing-valve and which are apt to become clogged or to freeze up when compressed air is used.

One of the peculiarities of this valve mechanism is that there are two valves which stand on an equalizing-lever held by a pin which carries the load. The moving strain on the piston is the same as that of a balanced valve, as it only requires enough power to overcome the sliding friction of the valves and friction on the pin.

What I claim as my invention, and desire to secure by Letters Patent, is—

1. The combination with a suitable cylinder and steam-chest communicating therewith, of a piston working in said cylinder, said piston having inclined faces, a rocking lever, the outer ends of said rocking lever being adapted to be engaged by said piston, and valves moving at right angles to said piston, the outer ends of said lever, which are in contact with the cylinder, being directly under and engaging said valves, and said valves controlling ports leading to said cylinder, substantially as set forth.

2. The combination with a suitable cylinder and steam-chest communicating therewith, of a piston working in said cylinder, said piston having inclined faces, a rocking lever in a chamber below the steam-chest and in communication with the cylinder, said chamber being entirely cut off from the steam-supply, the ends of said rocking lever engaging said piston, and valves moving at right angles to said piston engaged by said ends of said lever and controlling-ports leading to said cylinder, substantially as set forth.

3. The combination with a suitable cylinder and steam-chest communicating therewith, of a piston working in said cylinder, said piston having inclined faces, a rocking lever, the ends of said rocking lever being engaged by said piston, spool-valves moving at right angles to said piston engaged by said ends of said lever and controlling-ports leading to said cylinder, substantially as set forth.

4. The combination with a suitable cylinder and steam-chest communicating therewith, of a piston moving in said cylinder, valves in said steam-chest operated by said piston, said piston operating one of said valves while the other is operated by the pressure of the motive force employed, and vice versa, substantially as set forth.

5. The combination with a suitable cylinder and steam-chest communicating therewith, of a piston moving in said cylinder, said piston having inclined faces, a rocking lever mounted in said steam-chest, the ends of said rocking lever being adapted to be engaged by said piston, valves in said steam-chest controlling ports to said cylinder, one of said valves being operated by said rocking lever while the other is operated by the pressure of the motive force, and vice versa, substantially as set forth.

In testimony whereof I, the said ALBERT BALL, have hereunto set my hand.

ALBERT BALL.

Witnesses:
FRANK A. BALL,
H. H. NEMER.